United States Patent Office 2,875,496
Patented Mar. 3, 1959

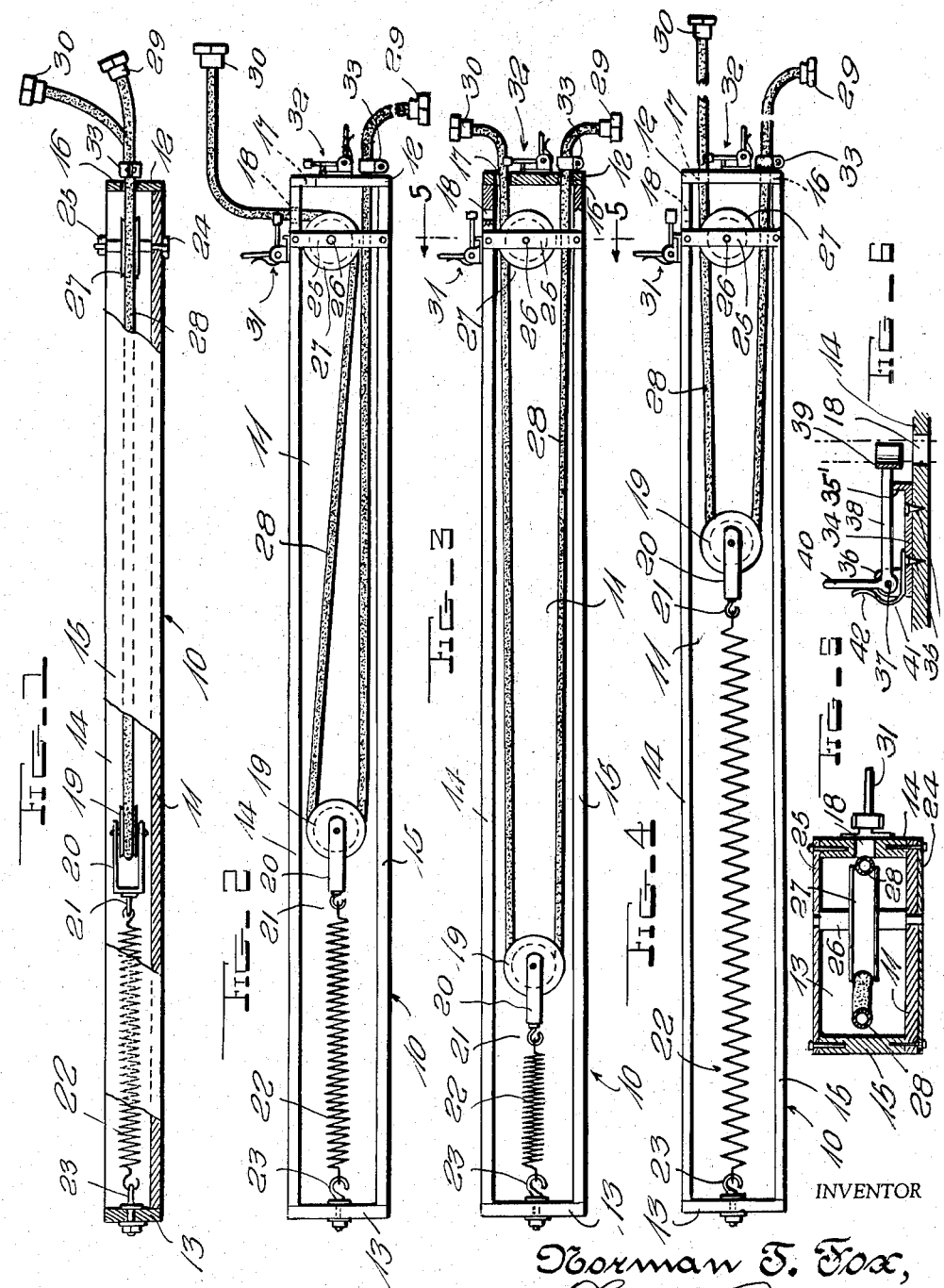

2,875,496

LATCH FOR A CONNECTING HOSE FOR TRAILERS AND THE LIKE

Norman T. Fox, Jennings Lodge, Oreg.

Application March 6, 1953, Serial No. 340,700

1 Claim. (Cl. 24—254)

The present invention relates to a latch for a connecting hose for trailers and the like and it consists in the combinations, constructions and arrangements of parts herein described and claimed.

Generally there is provided a connecting hose for use with trailers and the like. There is provided an elongated rectangular housing through one end of which extends a hose which thereafter extends over a pulley which, in turn, is connected by an elongated tension spring to the other end of the housing and thence extends selectively through the first-mentioned end of the housing or through one side of the housing adjacent the first-mentioned end. A second guide pulley is provided within the housing and a novel latch is provided for maintaining the hose in selected positions. The device is such that when once mounted upon a trailer or the like, one end of the hose may be withdrawn from the housing against the action of the spring and then locked in such position whereupon the thus extended portion of the hose may be connected with a source of water supply. By releasing the latch the spring means within the housing acts to retract the extended portion of the hose when the same is no longer needed.

Another object of the invention is to provide, in a device of the character set forth, a novel latch forming a part of the invention.

Other and further objects of the invention will become apparent from a reading of the following specification taken in conjunction with the drawing, in which:

Figure 1 is a side elevational view, partly broken away, of an embodiment of the invention, Figure 2 is a plan view of Figure 1, illustrating a hose forming a part of the invention extending through an outlet port in one side of a housing likewise forming a part of the invention, Figure 3 is a view similar to Figure 2 but illustrating the use of an alternate port forming a part of the invention, Figure 4 is a view similar to Figures 2 and 3 but illustrating the manner of operation of a pulley and tension spring forming a part of the invention, Figure 5 is an enlarged sectional view taken along line 5—5 of Figure 3, and Figure 6 is an enlarged fragmentary sectional view illustrating a latch member forming a part of the invention.

Referring more particularly to the drawing there is shown therein a device of the character set forth including an elongated casing generally designated at 10 and comprising a rectangular bottom wall 11, an outer end wall 12 and an inner end wall 13 and a pair of side walls 14 and 15.

The end wall 12 is provided with a hose port 16 adjacent the wall 15 and a hose port 17 adjacent the wall 14. In addition, the side wall 14 is provided with a hose port 18 adjacent the forward wall 12. A pulley 19 is mounted in a yoke 20 which is provided with a hook 21. The hook 21 is connected to one end of an elongated tension spring 22, the other end being connected to a hook 23 mounted centrally on the inner end wall 13.

A strap 24 is affixed transversely upon the underside of the bottom wall 11 adjacent the forward wall 12 but in spaced relation thereto and a like strap 25 is affixed atop the side walls 14 and 15 immediately over the strap 24, the straps 24 and 25 forming a mounting for a vertical spindle 26 upon which is revolubly mounted within the casing 10 a guide pulley 27. A connecting hose 28 is provided at one end with a coupling member 29 which is adapted to be connected with the pipe system of a trailer or the like and at its other end with a coupling member 30 which is adapted to be connected to an independent water supply. The hose 28 extends from the coupling 29 through the port 16 and thence over the pulley 19 and thence forwardly either through the port 17, as illustrated in Figure 3 or through the port 18, as illustrated in Figure 2.

A latch member generally designated at 31 is attached to the side wall 14 adjacent the port 18 and a latch member generally designated at 32 is mounted upon the forward end wall 12 adjacent the port 17. A clamp member 33 is affixed to the hose 28 between the coupling 29 and the end wall 12 to limit the inward movement of the hose through the port 16.

Since the latch members 31 and 32 are identical in construction, reference is made to Figure 6 for the details of construction of such latches. It will be seen that there is provided a base plate 34 which is attached to the wall of the casing 10 by means of screws 35 or the like which plate is provided at that end thereof adjacent its associated port with an outwardly extending abutment 35′ while at the other end of the plate there is provided a pair of outstanding ears 36 upon which is pivotally mounted, as indicated at 37 a bell crank having one arm 38 provided at its outer end with a socket 39 while the other arm 40 extends normally outwardly. A spring 41 is affixed to the outer side of the plate 34 and has its free end 42 bearing against the outer side of the arm 40.

In operation, the housing 10 may be mounted upon any convenient portion of a trailer or the like, preferably upon the bottom of the body thereof and in such manner that manual access is provided to the end wall portion 12. The coupling member 29 is then connected to the water system conventionally found in such trailer. When the trailer reaches a stopping point where an independent water supply is available, it is only necessary to grasp that portion of the hose 28 which extends through the port 17 and pull the same outwardly of the housing 10 until it is possible to connect the coupling member 30 with such independent water supply. The hose may be then locked in such position by means of the latch 32. If it is found more convenient to move the hose outwardly of the port 18 in the manner illustrated in Figure 2, it is only necessary to entrain the hose over the inner side of the guide pulley 27 and then extend the same through the port 18 whereupon, when the hose is in desired position it may be latched against inward movement due to the spring 22 by means of the latch member 31. In either case, the latch member 31 may be moved out of engagement with the hose by pressing the arm 40 away from the associated port 17 or 18 as the case may be to thus disengage the socket 39 from such hose. When it is desired to lock the hose in position, it is only necessary to release the arm 40 whereupon the spring 42 will act to maintain the socket 39 in vigorous contact with the hose to hold the same in position, it being understood that the socket member partially embraces the hose when in locked position and that the spring 42 at this time urges the hose into frictional contact with one side of the port 17 or 18 as the case may be. When it is again desired to move the trailer, it is only necessary to disconnect the coupling 30 from the permanent water supply aforesaid and then move the arm 40 again outwardly to allow the spring 22 to contract to the position shown, for example, in Figure 3. This action will cause the retraction of the previously extended portion of the hose 28 again into the confines of the housing 10 as shown, for example, in Figure 3 of the drawing.

While but one form of the invention has been shown and described herein, it will be readily apparent to those skilled in the art that many minor modifications may be made without departing from the spirit of the invention or the scope of the appended claim.

What is claimed is:

For use with a wall having a port therein for the passage therethrough of a hose, a latch comprising a mounting plate affixed to the outer side of said wall adjacent said port, a pair of outstanding ears affixed to one end of said plate, an outwardly extending abutment formed at the other end of said plate adjacent said port, a bell crank lever pivotally mounted between said ears, said lever having one arm adapted to bear against said abutment and having its other arm extending normally outwardly, a hose-engaging socket affixed to the free end of said one arm, and a spring affixed to the outer side of said plate and bearing against the outer side of said other arm.

References Cited in the file of this patent

UNITED STATES PATENTS

| | | |
|---|---|---|
| 1,086,354 | Dysinger | Feb. 10, 1914 |
| 1,417,484 | Baker | May 30, 1922 |
| 1,493,936 | Hale | May 13, 1924 |
| 1,940,701 | Shope | Dec. 26, 1933 |
| 1,974,811 | Gattinger | Sept. 25, 1934 |
| 2,047,342 | Waller | July 14, 1936 |
| 2,118,294 | Cox | May 24, 1938 |
| 2,191,973 | Sommer | Feb. 27, 1940 |
| 2,482,851 | Jennewun | Sept. 27, 1949 |
| 2,658,133 | Barrow | Nov. 3, 1953 |